United States Patent [19]

Kato et al.

[11] Patent Number: 4,518,626
[45] Date of Patent: May 21, 1985

[54] PROCESS FOR PREPARING MAGNETIC RECORDING MEDIUM

[75] Inventors: Mikihiko Kato; Shigeo Komine; Toshio Kawamata; Kazuhiko Morita; Tsunehiko Sato, all of Kanagawa, Japan

[73] Assignee: Fuji Photo Film Co. Ltd., Kanagawa, Japan

[21] Appl. No.: 566,455

[22] Filed: Dec. 28, 1983

[30] Foreign Application Priority Data

Dec. 29, 1982 [JP] Japan .................. 57-230910

[51] Int. Cl.$^3$ .................................. H01F 10/02
[52] U.S. Cl. ........................ 427/48; 427/128; 427/130
[58] Field of Search .............. 427/48, 127-132

[56] References Cited

U.S. PATENT DOCUMENTS 3,627,580 12/1971 Krall .................. 117/238

Primary Examiner—Bernard D. Pianalto

[57] ABSTRACT

A process for preparing a magnetic recording medium comprised of a non-magnetic support having a magnetic layer coated thereon is disclosed. The process involves continuously travelling an undried magnetic layer on a support through a means for magnetic orientation. The means is comprised of at least 5 magnets which are installed at intervals from each other over the undried magnetic layer or under the support. The magnets are positioned in such a manner that each adjacent pole of the magnets facing the magnetic layer or the reverse surface of the support has a different polarity and that the strength of the magnetic field of each adjacent magnet is gradually reduced toward the travelling direction of the magnetic layer. Further the magnets are positioned in such a manner that the line of direction of the magnetic force between adjacent magnets is parallel to the magnetic layer and in opposite directions, whereby the ferromagnetic fine particles in the magnetic layer are randomly oriented. When the particles are randomly oriented the magnetic material can be formed into magnetic recording discs which do not suffer from modulation which occurs with magnetic discs formed from magnetic material which has its magnetic particles oriented in a machine direction.

5 Claims, 2 Drawing Figures

PROCESS FOR PREPARING MAGNETIC RECORDING MEDIUM

FIELD OF THE INVENTION

The present invention relates to a process for preparing a magnetic recording medium by coating a magnetic recording layer on a non-magnetic support in the strip form, and more particularly relates to a process for preparing a magnetic recording medium in the form of a disc or sheet by random orientation of ferromagnetic fine particles contained in the magnetic recording layer.

BACKGROUND OF THE INVENTION

In general, magnetic recording media such as flexible magnetic discs or magnetic sheets can be prepared by coating a non-magnetic support (e.g., polyethylene terephthalate, cellulose triacetate, cellulose diacetate, poly(-vinylidene chloride) or polypropylene) which is in the form of strip and is continuously travelling in the machine direction with a coating composition containing ferromagnetic fine particles (e.g., $\gamma$-$Fe_2O_3$, $Fe_3O_4$, Co-doped $\gamma$-$Fe_2O_3$, Co-doped $\gamma$-$Fe_3O_4$ or $CrO_2$) dispersed in a solvent solution of a binder (e.g., a vinyl chloride-vinyl acetate copolymer, a vinyl chloride-acrylonitrile copolymer, an acrylic acid ester-acrylonitrile copolymer, an acrylic acid ester-vinylidene chloride copolymer, an acrylic acid copolymer, a urethane elastomer, a nylon-silicone type copolymer, nitrocellulose, polyvinyl chloride, a vinylidene chloride-acrylonitrile copolymer, a polyamide resin, polyvinyl butyral, cellulose derivatives, a styrene-butadiene copolymer, a phenol resin, an epoxy resin, polyurethane, a urea resin, a melamine resin, a polyester resin, a chlorovinyl etheracrylic acid ester copolymer, a blend polymer of methacrylate copolymer and diisocyanate, an amino resin or a synthetic rubber) by a conventional coating method such as top-reverse coating method, bottom-reverse coating method, doctor coating method or gravure coating method, and drying the coating layer. When ferromagnetic fine particles are arranged in a particular direction during the manufacturing steps of the magnetic recording medium, anisotropy occurs in the magnetic recording medium, and as a result, anisotropy occurs in magnetic properties and electromagnetic properties in various directions.

When a magnetic recording medium in which magnetic particles have been arranged in the coating or machine direction is used as a magnetic disc, the output level of the reproduced signal in the coating direction is higher than that in other directions, and as a result, the output signal level reproduced by rotating magnetic discs changes depending upon the position of the magnetic discs where the signal is recorded. This phenomenon is referred to as modulation. Therefore, flexible magnetic discs which are used for recording and reproducing by rotation have been conventionally prepared while physically removing orientation of magnetic particles or while excluding a magnetic field during the production of magnetic recording tapes so that the ferromagnetic fine particles are not arranged in the linear direction. However, even if the above particular means is applied, there is a problem in that magnetic particles are arranged in the coating direction by orientation due to the flow of the coating composition and, as a result, the output level of the reproduced signals changes depending upon the position of the discs.

In order to eliminate orientation caused by the flow of the coating composition which is caused immediately after coating, it is proposed in Japanese Patent Publication (Unexamined) Nos. 104,205/78 and 149,607/79 that the magnetic coating layer be subjected to magnetic orientation to one direction in a first magnetic field for orientation and then be subjected to magnetic orientation in a second magnetic field for orientation which is weaker than the first magnetic field, with the direction of orientation of the second field being the reverse of the first field.

However, according to the method and apparatus as proposed in the above Japanese patent publications, random orientation can not be sufficiently attained because random orientation treatment disclosed in these prior arts is conducted intermittently and is completed in a short period of time since this conventional process uses the independent lines of the magnetic field caused by each magnetic field for orientation and uses only first and second magnetic fields for orientation.

SUMMARY OF THE INVENTION

The present inventors have carried out various types of research related to random magnetic orientation and patterns of magnetic field strength, and as a result have discovered the method of the present invention.

An object of the invention is to provide a process for preparing a magnetic recording medium by a simple treatment of random orientation without the disadvantages of conventional methods.

DETAILED DESCRIPTION OF THE INVENTION

Figure 1:
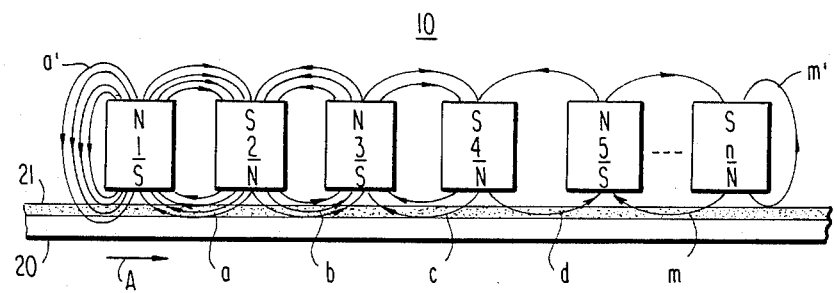
FIG. 1 is a plane schematic view of a random orientation means of the present invention.

The present invention relates to a process for preparing a magnetic recording medium comprising a non-magnetic strip support base having coated thereon a magnetic coating layer. The process comprises continuously travelling a support base having coated thereon an undried magnetic layer through a means for random magnetic orientation comprising at least 5 magnets which are installed at an interval from each other over the undried magnetic layer or under the support base in such a manner that each adjacent pole of the magnets facing the magnetic layer or the reverse surface of the support has a different polarity. The magnets are arranged so that the strength of the magnetic field of each magnet is gradually reduced toward the travelling direction of the magnetic layer, and so that the direction of the line of magnetic force between adjacent magnets is parallel to the magnetic layer. The direction of the line of magnetic force of every other magnet is reversed whereby ferromagnetic fine particles in the magnetic layer can be arranged in random direction from the oriented state in one direction.

The process of the present invention will be explained in more detail by referring to the drawings showing a preferred embodiment of the present invention.

A magnetic coating composition is coated on a non-magnetic strip support 20 which is continuously travelling in one direction. Any conventional coating method (not shown), as described above, can be used to provide the magnetic coating layer 21 in a uniform thickness.

The layer 21 is passed through an random orientation means 10 and then introduced into a drying means (not shown) for evaporation of the solvent from the magnetic layer.

The random orientation means 10 is composed of at least 5 magnets. Various types of magnetic can be used such as a rare earth cobalt type magnet, an alnico type magnet, a barium ferrite type magnet, etc. Each magnet 1, 2, 3, 4, 5, . . . "n" has magnetic poles in the top and bottom ends and each is installed at a predetermined interval from the next magnet with the magnets being positioned over the coating side of the support 20 in the travelling direction "A" of the support 20. Although not shown in FIG. 1, the series of magnets may be installed under the support.

Each magnet 1 to "n" in the random orientation means 10 is arranged as follows:

Each polar of the magnet 1 to "n" facing the coating layer (or the reverse surface of the support, as the case may be) has an opposite polarity from that of the adjacent magnet, i.e., . . . N, S, N, S, . . .

The interval between magnets 1 to "n" can be predetermined in such a manner that lines of magnetic force "a", "b", "c", "d", . . . , "n" are parallel to the surface of magnetic coating layer and are generated substantially continuously.

Figure 2:
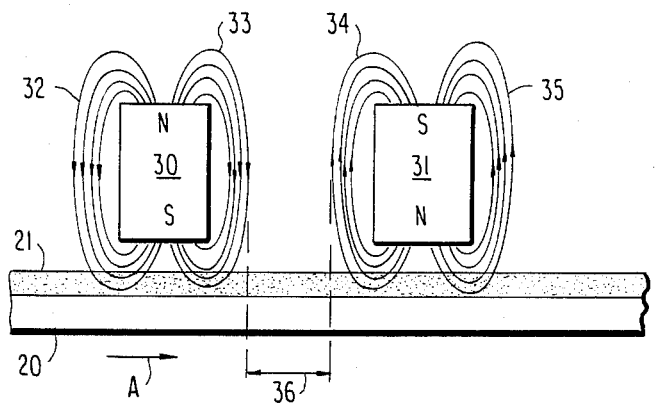
FIG. 2 is a plane schematic view of a conventional random orientation means.

The term "lines of magnetic force which are generated substantially continuously" as used above means that where independent lines of magnetic force 32 to 35 are generated from each magnet 30, 31 as shown in FIG. 2, a nonmagnetic magnetic field area 36 is not substantially present from the standpoint of random orientation action.

The interval between the magents can be determined based on factors such as the strength of the magnetic field. In general, the distance between each magnet 1 to "n" is 5 to 25 cm, preferably 8 to 15 cm, and more preferably 10 to 13 cm.

The strength of the magnetic field for each magnet 1 to "n" can be determined in such a manner that it is gradually reduced toward the travelling direction "A" of the support 20.

The rate of the gradual reduction in the strength of magnetic field can be varied based on the kind of ferromagnetic fine particles, coercivity of the particles, number of magnets, distance between the magnets, etc. In general, the strength of magnetic field for the first magnet 1 is 400 to 80 gauss and the strength of magnetic fields for magnets 2 to "n" is each gradually reduced at a rate of 10 to 70 gauss. For example, when the first strength of magnetic field is 400 gauss, the rate of the gradual reduction can be 70 to 80 gauss below the magnetic field of the proceeding magnet, and when the first strength of magnetic field is 80 gauss, the rate of the gradual reduction can be 10 gauss below the magnetic field of the proceeding magnet.

The number of magnets for the random orientation means 10 is preferably at least 5, preferably 5 to 10.

The distance between the magnetic layer and the magnet pole facing the magnetic layer can be suitably adjusted so as to obtain the desired strength of magnetic flux for random orientation, in either case where the magnets are positioned over or under the magnetic recording medium. For example, when a magnet of 3250 Oe is used, the strength of magnetic field is about 300 gauss at a distance of 20 to 30 mm and about 100 gauss at a distance of 50 mm.

The strip support 20 which enters the random orientation means 10 passes through the independent line a' of magnetic force of the first magnet 1, whereby the magnetic coating layer 21 provided on the support 20 can be strongly subjected to magnetic orientation in the machine direction.

The orientated particles undergo partial relaxation to the unoriented state to the same degree as conventional orientation methods when the magnetic coating layer is subjected to initial magnetic orientation by the line a' of magnetic force of the present invention, because the zone for acting the independent line a' of magnetic force is comparatively small and because the fluidity of the magnetic coating layer 21 is still much higher. However, while the magnetic coating layer 21 is travelling through each of the lines "a" to "m" of magnetic force which is provided at a certain distance from the line a' of magnetic force and which is continuously generated with gradual reduction in the strength of magnetic field in the travelling direction A of the support 20, the ferromagnetic fine particles in the magnetic layer 21 are continuously provided with orientation action in alternating directions without relaxation from the initially oriented state. Accordingly, the particles are arranged so that the orientation direction is reverse and they are fixed at a certain angle to the machine direction because the opposite orientation direction becomes weak due to the gradual reducing pattern of the strength of the magnetic field.

It is believed that the blockage of further orientation depends on the hardening rate of the magnetic coating layer 21.

After passing through the fifth magnet 5, the original orientation in the machine direction or travelling direction of the support 20 has been changed to random orientation. If the random orientation is not sufficient due to conditions such as coating speed, coating thickness or the viscosity of coating layer 21, then additional magnets 6 to "n" can be provided at approprite intervals and strengths of magnetic field which are gradually reduced from the fifth magnet 5.

The independent line m' of magnetic force generated from the final magnet "m" does not reorient the resulting random orientation of the magnetic coating layer 21 in the travelling direction of the support 20, because the strength of magnetic field of the final magnet "n" is very weak according to the gradually reducing pattern thereof, the hardening of the coating layer 21 continuously proceeds as the support travels and the acting zone of the line m' of magnetic force is small. As set forth previously, series of magnets can be provided under the support opposite to the magnetic coating layer 21. In this case, random orientation can be achieved sufficiently in the same manner as above.

According to the process of the present invention, the following advantages can be obtained.

That is, the process of this invention is effective for random orientation of ferromagnetic fine particles contained in a magnetic coated layer from the orientation in one direction by continuously travelling an undried magnetic coating layer provided on one surface of a non-magnetic strip support through a means for random magnetic orientation comprising at least five magnets which are installed at an interval from each other over the undried magnetic layer or under the support base, the magnets being positioned in such a manner that each adjacent pole of the magnets facing the magnetic layer or the reverse surface of the support base has a different polarity, that the strength of the magnetic field of each magnet is gradually reduced toward the travelling direction of the magnetic layer and that the direction of the line of the magnetic force between adjacent magnets is parallel to the magnetic layer and in opposite direction, whereby ferromagnetic fine particles can be effectively subjected to random magnetic orientation and do not undergo the relaxation from the random orientation. The magnetic orientation steps can be conducted by compact devices, and therefore, the modulation in conventional magnetic discs can be prevented and the random magnetic orientation steps can be more simple.

The process of this invention will be described in more detail by the following Example. However, the scope of the invention is not limited to this example.

EXAMPLE

On a surface of polyethylene terephthalate film having a thickness of 75 microns, a magnetic coating composition having the following composition was coated at a rate of 40 meter/minute by a doctor coating method to provide a magnetic coating layer having a dry thickness of 3 microns. The layer was then passed through a random orientation means composed of rare earth-cobalt magnets which were provided at intervals of 13 cm from each other over the magnetic coating layer. The number of magnets and the strength of the magnetic field of each magnet are shown in Table 1. Thus, ferromagnetic fine particles contained in the magnetic coating layer were subjected to random magnetic orientation. The squareness ratio (residual flux density/maximum flux density) in the travelling direction of the support which was the coating direction (SQ∥), and the squareness ratio in the transverse direction (SQ⊥) which made a right angle with the coating direction of the thus obtained samples were measured. The ratio of orientation degree (SQ⊥/SQ∥) was then determined. The results are shown in Table 1.

| Magnetic Coating Composition (Parts by Weight): | |
| --- | --- |
| γ-Fe$_2$O$_3$ | 400 |

| Magnetic Coating Composition (Parts by Weight): | |
| --- | --- |
| Polyurethane (Trade name "Nipporan 3022" manufactured by Nippon Polyurethane Co., Ltd.; binder) | 60 |
| Vinyl chloride-vinyl acetate copolymer (VMCH; binder) | 40 |
| Lecithin (dispersing agent) | 6 |
| Stearic acid (lubricant) | 5 |
| Carbon | 30 |
| Methyl ethyl ketone | 500 |
| Methyl isobutyl ketone | 200 |
| Cyclohexanone | 200 |
| (Viscosity: 30 ps) | |

The ratio of orientation degree is preferably 0.95 to 1.0 from the standpoint of electromagnetic properties.

It is apparent from the ratio of orientation degree shown in Table 1 that the process of the present invention which utilizes 5 or more magnets installed at close intervals (Sample Nos. 1, 2, 7, 12 and 13) provides a ratio of orientation degree better than that of the process which utilizing up to 4 magnets (Sample Nos. 3, 4, 5, 8, 9, 10, 11, 14, 15, 16 and 17). That is, according to the process of this invention, random orientation can be attained effectively.

From the results obtained in Sample Nos. 3, 4, 5, 8, 9, 10, 11, 14, 15, 16 and 17 shown in Table 1, it will be apparent that the ratio of orientation degree would decrease if the magnets are arranged at longer intervals, e.g., 25 to 30 cm.

TABLE 1

| Sample No. | Viscosity of Coating Composition (PS) | Coating Speed (m/min.) | Coating Thickness (μm) | Magnets Material: Rare Earth Cobalt Magnet Interval of Each Magnet: 13 cm | | | | | | Ratio of Orientation Degree ⊥/∥ | |
| --- | --- | --- | --- | --- | --- | --- | --- | --- | --- | --- | --- |
| | | | | 1st (Gauss) | 2nd (Gauss) | 3rd (Gauss) | 4th (Gauss) | 5th (Gauss) | 6th (Gauss) | | |
| 1 | 30 | 40 | 3 | 400 | 320 | 260 | 190 | 120 | 50 | 0.99 | (Present Invention) |
| 2 | " | " | " | 400 | 320 | 260 | 190 | 120 | — | 0.98 | (Present Invention) |
| 3 | " | " | " | 400 | 320 | 260 | 190 | — | — | 0.95 | |
| 4 | " | " | " | 400 | 320 | 260 | — | — | — | 0.93 | |
| 5 | " | " | " | 400 | 320 | — | — | — | — | 0.90 | |
| 6 | " | " | " | 300 | — | — | — | — | — | 0.88 | |
| 7 | " | " | " | 300 | 250 | 200 | 150 | 100 | — | 0.99 | (Present Invention) |
| 8 | " | " | " | 300 | 250 | 200 | 150 | — | — | 0.96 | |
| 9 | " | " | " | 300 | 250 | 200 | — | — | — | 0.92 | |
| 10 | " | " | " | 300 | 250 | — | — | — | — | 0/89 | |
| 11 | " | " | " | 300 | — | — | — | — | — | 0.87 | |
| 12 | " | " | " | 250 | 220 | 190 | 160 | 130 | 100 | 0.99 | (Present Invention) |
| 13 | " | " | " | 250 | 220 | 190 | 160 | 130 | — | 0.98 | (Present Invention) |
| 14 | " | " | " | 250 | 220 | 190 | 160 | — | — | 0.95 | |
| 15 | " | " | " | 250 | 220 | 190 | — | — | — | 0.92 | |
| 16 | " | " | " | 250 | 250 | — | — | — | — | 0.89 | |
| 17 | " | " | " | 250 | — | — | — | — | — | 0.87 | |

While the invention has been described in detail and with reference to specific embodiments thereof, it will be apparent to one skilled in the art that various changes and modifications can be made therein without departing from the spirit and scope thereof.

What is claimed is:

1. A process for preparing a magnetic recording medium comprising a non-magnetic strip support base having coated thereon a magnetic coating layer, the process comprising the step of continuously travelling an undried magnetic layer on a support through a means for random magnetic orientation comprising at least five magnets which are installed at an interval from each other over the undried magnetic layer or under the support base, said magnets being positioned in such a manner that each adjacent pole of the magnets facing the magnetic layer or the reverse surface of the support base has a different polarity, that the strength of the magnetic field of each magnet is gradually reduced toward the travelling direction of the magnetic layer and that the direction of the line of the magnetic force between adjacent magnets is parallel to the magnetic layer and in opposite directions, whereby ferromagnetic fine particles in the magnetic layer are randomly oriented.

2. A process as claimed in claim 1, wherein the interval between adjacent magnets is in the range of 5 to 25 cm.

3. A process as claimed in claim 1, wherein the strength of the magnetic field of a first magnet is 400 to 80 gauss and the strength of the magnetic field of each adjacent magnet is reduced 10 to 70 gauss below the preceeding magnet.

4. A process as claimed in claim 1, wherein 5 to 10 magnets are used.

5. A process as claimed in claim 1, further comprising the step of drying the magnetic layer.

* * * * *